United States Patent
Cho et al.

(10) Patent No.: US 11,320,820 B2
(45) Date of Patent: May 3, 2022

(54) HYPERASSOCIATION IN EPISODE MEMORY

(71) Applicant: GM GLOBAL TECHNOLOGY OPERATIONS LLC, Detroit, MI (US)

(72) Inventors: Youngkwan Cho, Los Angeles, CA (US); Rajan Bhattacharyya, Sherman Oaks, CA (US); Michael J. Daily, Thousand Oaks, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 375 days.

(21) Appl. No.: 16/365,517

(22) Filed: Mar. 26, 2019

(65) Prior Publication Data
US 2020/0310423 A1 Oct. 1, 2020

(51) Int. Cl.
*G05D 1/00* (2006.01)
*G06N 3/02* (2006.01)
*G05D 1/02* (2020.01)

(52) U.S. Cl.
CPC .......... *G05D 1/0088* (2013.01); *G05D 1/021* (2013.01); *G06N 3/02* (2013.01)

(58) Field of Classification Search
CPC .............. G05D 1/0088; G05D 1/021; G05D 2201/0213; G05D 2201/02; G06N 3/02
USPC ......................................................... 701/27
See application file for complete search history.

(56) References Cited

U.S. PATENT DOCUMENTS

| | | | |
|---|---|---|---|
| 10,019,011 B1* | 7/2018 | Green | B60W 30/18109 |
| 2018/0210939 A1* | 7/2018 | Cho | G06F 16/28 |
| 2019/0126921 A1* | 5/2019 | Gwin | B60W 40/09 |
| 2020/0249674 A1* | 8/2020 | Dally | B60W 60/00274 |
| 2020/0293064 A1* | 9/2020 | Wu | G05D 1/0289 |
| 2020/0307595 A1* | 10/2020 | Kato | B60W 60/0013 |

OTHER PUBLICATIONS

Anderson, et al., "An integrated theory of the mind", Psychological Review, 2004, vol. 111, No. 4, American Psychological Association, pp. 1036-1060. DOI: 10.1037/0033-295X111.4.1036.
Laird, et al., "SOAR: An architecture for general intelligence" Stanford University CA Dept. of Computer Science, Dec. 3, 1986, Artificial Intelligence, 33(1), 1-64. (1987).
Langley, et al., "Hierarchical skills and cognitive architectures", Proceedings of the Annual Meeting of the Cognitive Science Society, 26(26), 2004, pp. 779-784.

(Continued)

*Primary Examiner* — Jonathan M Dager
*Assistant Examiner* — Jean W Charleston
(74) *Attorney, Agent, or Firm* — Cantor Colburn LLP

(57) ABSTRACT

An autonomous vehicle, system and method of operating the autonomous vehicle. The system includes an episodic memory, a hyper-association module and a navigation system. The episodic memory stores a plurality of episodes, recalls a plurality of candidate episodes in response to receiving a partial prefix and recalls a hypothesis episode in response to receiving an intermediate episode. The hyper-association module receives the plurality of candidate episodes from the episodic memory and obtains the intermediate episode from the plurality of candidate episodes. The navigation system navigates the autonomous vehicle using the hypothesis episode.

13 Claims, 3 Drawing Sheets

(56) References Cited

OTHER PUBLICATIONS

Lew, et al., "Content-Based Multimedia Information Retrieval: State of the Art and Challenges.", ACM Transactions on Multimedia Computing, Communications and Applications, vol. 2, No. 1, Feb. 2006, pp. 1-19.

Nuxoll, et al., "Extending Cognitive Architecture with Episodic Memory", AAAI'07 Proceedings of the 22nd national conference on Artificial intelligence—vol. 2, pp. 1560-1565, 2007.

Nuxoll, et al., "A Cognitive Model of Episodic Memory Integrated With a General Cognitive Architecture", In Proceedings of the Sixth International Conference on Cognitive Modeling, 220-225. Mahwah, NJ: Lawrence Earlbaum.

Nuxoll, et al., "Comprehensive working memory activation in SOAR", Proc. of the 6th Int. Conf.on Cognitive Modelling, pp. 226-230.

Winkler, et al., Memories for Robots Performing Everday Manipulation Activities' Advances in Cognitive Systems 3 (2014), Cognitive Systems Foundation, pp. 47-66.

\* cited by examiner

HYPERASSOCIATION IN EPISODE MEMORY

INTRODUCTION

The subject disclosure relates to autonomous vehicles and, in particular, to the use of hyper-association in episodic memory of a cognitive processor to determine trajectory information of agent vehicles for the navigation of the autonomous vehicles.

Autonomous vehicles are intended to move a passenger from one place to another with no or minimal input from the passenger. Such vehicles require the ability to obtain knowledge about agents in its environment and their possible motions and to calculate a trajectory for the autonomous vehicle based on this knowledge. Such knowledge can be stored in spatiotemporal data streams called episodes and stored in memory. Accordingly, it is desirable to provide a system which can recall episodes at appropriate times in order to hypothesize vehicle trajectories based current episodic activity.

SUMMARY

In one exemplary embodiment, a method of operating an autonomous vehicle is disclosed. A partial prefix is obtained at the autonomous vehicle. A plurality of candidate episodes are recalled from an episodic memory associated with the autonomous vehicle in response to receiving the partial prefix at the episodic memory. Each of the candidate episodes is compared to the partial prefix at a hyper-association module associated with the autonomous vehicle to obtain an intermediate episode. A hypothesis episode is selected based on the intermediate episode. The autonomous vehicle is navigated based on the hypothesis episode.

In addition to one or more of the features described herein, the intermediate episode is used as a cue to recall an episode from the episodic memory as the hypothesis episode. In one embodiment, the intermediate episode recalls more than one candidate from the episode memory and the candidates recalled by the intermediate episode are provided to the hyper-association module. The episodic memory and hyper-association module are components of a hypothesizer of a cognitive processor of the autonomous vehicle, and the hypothesizer provides the hypothesis episode to the cognitive processor. The hyper-association module applies a metric between the partial prefix and each candidate episode to determine a similarity between the partial prefix and the candidate episode. The hyper-association module selects a candidate from the plurality of candidate episode having the smallest metric as the intermediate episode. The hyper-association module combines at least some of the plurality of candidates to form the intermediate episode when none of the metrics for the plurality of candidates meets a selected criterion. The intermediate episode is created by combining the candidates in the order of a rank based on the metric.

In another exemplary embodiment, a system for operating an autonomous vehicle is disclosed. The system includes an episodic memory, a hyper-association module and a navigation system. The episodic memory stores a plurality of episodes, recalls a plurality of candidate episodes in response to receiving a partial prefix and recalls a hypothesis episode in response to receiving an intermediate episode. The hyper-association module receives the plurality of candidate episodes from the episodic memory and obtains the intermediate episode from the plurality of candidate episodes. The navigation system navigates the autonomous vehicle using the hypothesis episode.

In addition to one or more of the features described herein, the episodic memory and the hyper-association module are components of a hypothesizer of a cognitive processor of the autonomous vehicle. The hyper-association module applies a metric between the partial prefix and each of the plurality of candidate episodes. The hyper-association module selects a candidate episode from the plurality of candidate episodes having the smallest metric as the intermediate episode. The hyper-association module combines at least some of the plurality of candidate episodes to form the intermediate episode. The hyper-association module creates the intermediate episode by combining the candidates in the order of a rank based on the metric.

In yet another exemplary embodiment, an autonomous vehicle is disclosed. The autonomous vehicle includes an episodic memory, a hyper-association module and a navigation system. The episodic memory stores a plurality of episodes, recalls a plurality of candidate episodes in response to receiving a partial prefix and recalls a hypothesis episode in response to receiving an intermediate episode. The hyper-association module receives the plurality of candidate episodes from the episodic memory obtains the intermediate episode from the plurality of candidate episodes. The navigation system navigates the autonomous vehicle using the hypothesis episode.

In addition to one or more of the features described herein, the episodic memory and the hyper-association module are components of a hypothesizer of a cognitive processor of the autonomous vehicle. The hyper-association module applies a metric between the partial prefix and each of the plurality of candidate episodes. The hyper-association module selects a candidate episode from the plurality of candidate episodes having the smallest metric as the intermediate episode. The hyper-association module selects a candidate episode from the plurality of candidate episodes having the smallest metric as the intermediate episode. The hyper-association module creates the intermediate episode by combining the candidates in the order of a rank based on the metric.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
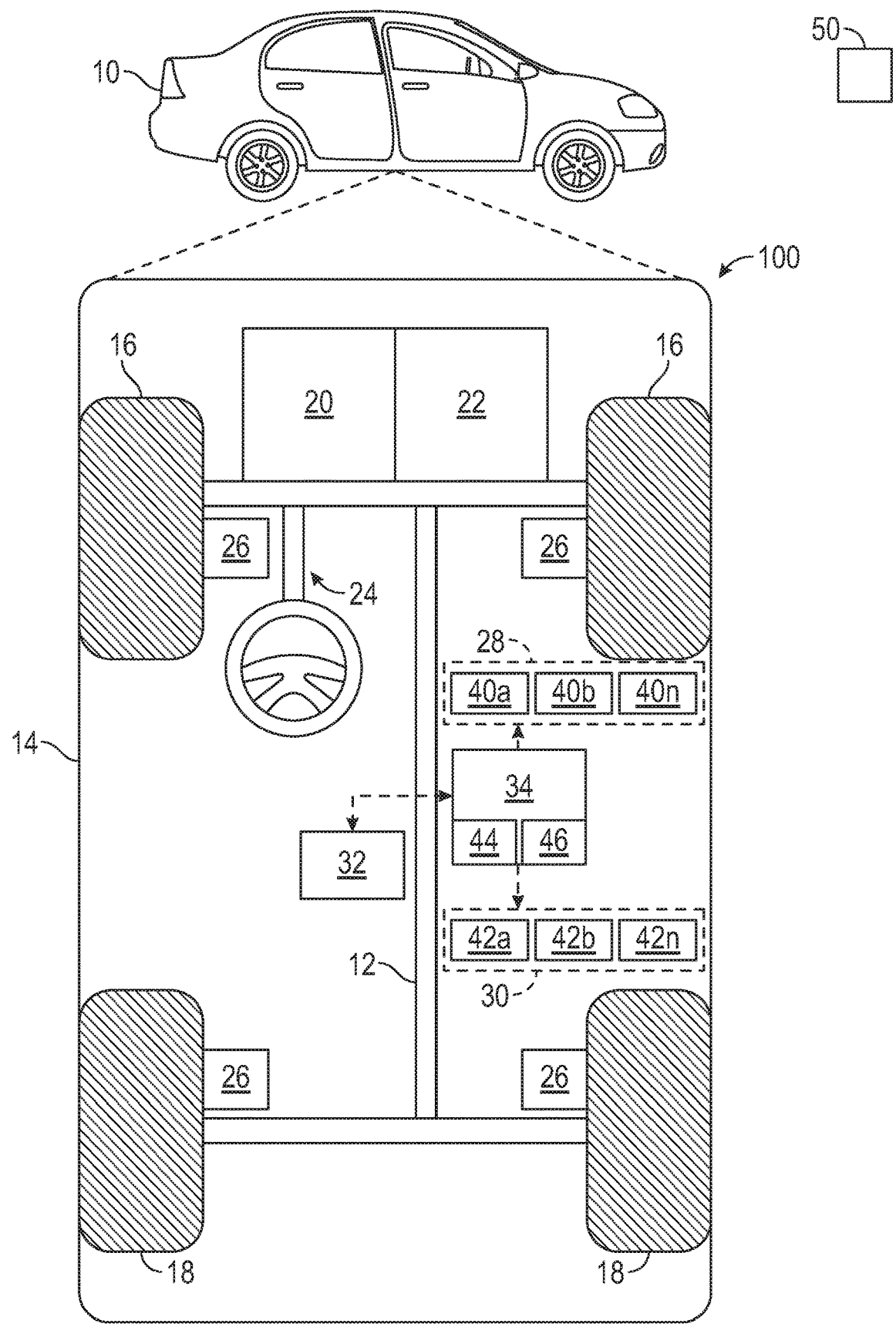
FIG. 1 shows an autonomous vehicle with an associated trajectory planning system depicted in accordance with various embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, FIG. 1 shows an autonomous vehicle 10 with an associated trajectory planning system depicted at 100 in accordance with various embodiments. In general, the trajectory planning system 100 determines a trajectory plan for automated driving of the autonomous vehicle 10. The autonomous vehicle 10 generally includes a chassis 12, a body 14, front wheels 16, and rear wheels 18. The body 14 is arranged on the chassis 12 and substantially encloses components of the autonomous vehicle 10. The body 14 and the chassis 12 may jointly form a frame. The wheels 16 and 18 are each rotationally coupled to the chassis 12 near respective corners of the body 14.

In various embodiments, the trajectory planning system 100 is incorporated into the autonomous vehicle 10. The autonomous vehicle 10 is, for example, a vehicle that is automatically controlled to carry passengers from one location to another. The autonomous vehicle 10 is depicted in the illustrated embodiment as a passenger car, but it should be appreciated that any other vehicle including motorcycles, trucks, sport utility vehicles (SUVs), recreational vehicles (RVs), etc., can also be used. At various levels, an autonomous vehicle can assist the driver through a number of methods, such as warning signals to indicate upcoming risky situations, indicators to augment situational awareness of the driver by predicting movement of other agents warning of potential collisions, etc. The autonomous vehicle has different levels of intervention or control of the vehicle through coupled assistive vehicle control all the way to full control of all vehicle functions. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, a cognitive processor 32, and at least one controller 34. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The sensing devices 40a-40n obtain measurements or data related to various objects or agents 50 within the vehicle's environment. Such agents 50 can be, but are not limited to, other vehicles, pedestrians, bicycles, motorcycles, etc., as well as non-moving objects. The sensing devices 40a-40n can also obtain traffic data, such as information regarding traffic signals and signs, etc.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but not limited to, doors, a trunk, and cabin features such as ventilation, music, lighting, etc. (not numbered).

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which includes an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms.

The controller 34 is further in communication with the cognitive processor 32. The cognitive processor 32 receives various data from the controller 34 and from the sensing devices 40a-40n of the sensor system 28 and performs various calculations in order to provide a trajectory to the controller 34 for the controller 34 to implement at the autonomous vehicle 10 via the one or more actuator devices 42a-42n. A detailed discussion of the cognitive processor 32 is provided with respect to FIG. 2.

Figure 2:
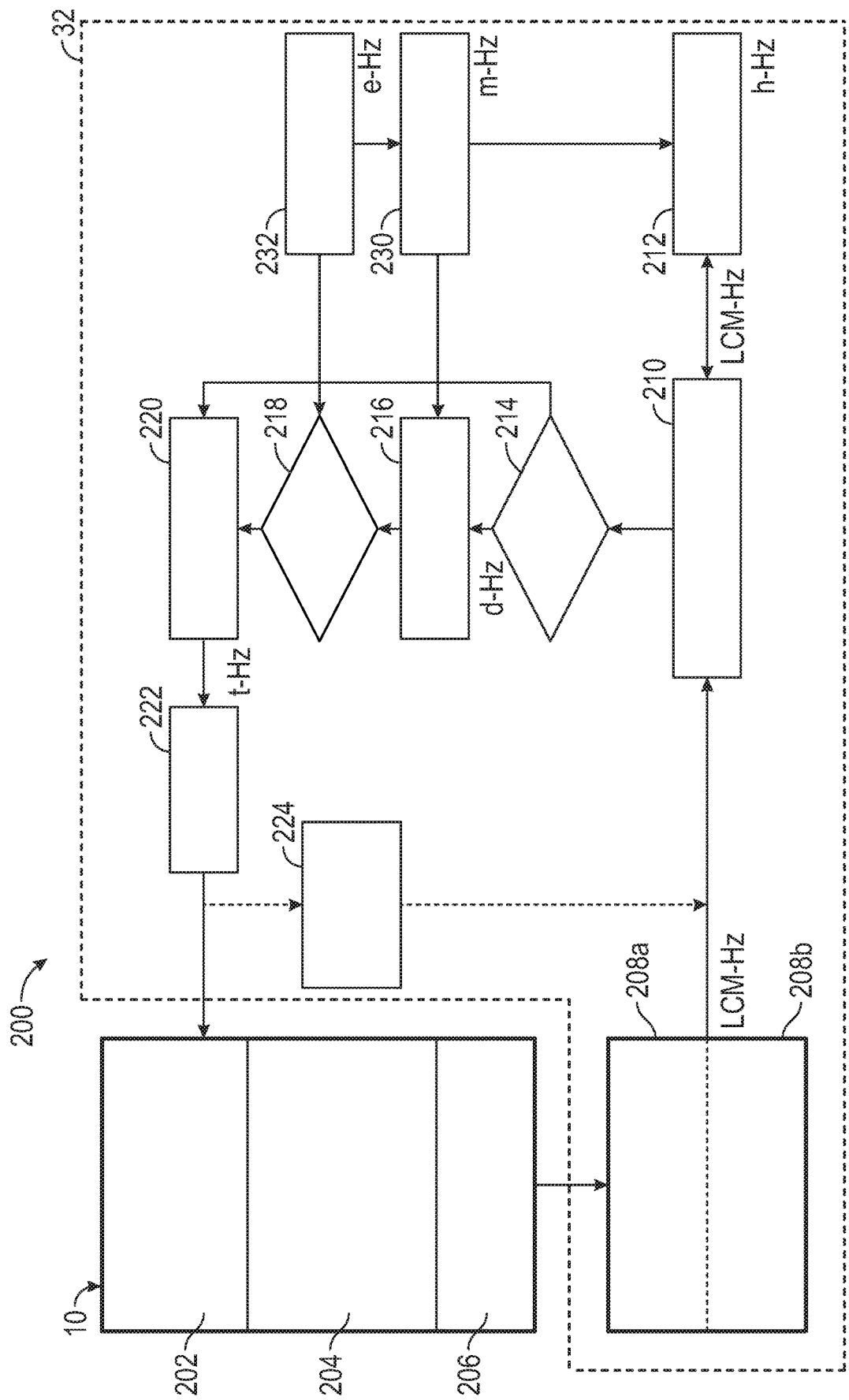
FIG. 2 shows an illustrative control system including a cognitive processor integrated with an autonomous vehicle or vehicle simulator.

FIG. 2 shows an illustrative control system 200 including a cognitive processor 32 integrated with an autonomous vehicle 10. In various embodiment the autonomous vehicle 10 can be a vehicle simulator that simulates various driving scenarios for the autonomous vehicle 10 and simulates various response of the autonomous vehicle 10 to the scenarios.

The autonomous vehicle 10 includes a data acquisition system 204 (e.g., sensors 40a-40n of FIG. 1). The data acquisition system 204 obtains various data for determining a state of the autonomous vehicle 10 and various agents in the environment of the autonomous vehicle 10. Such data includes, but is not limited to, kinematic data, position or pose data, etc., of the autonomous vehicle 10 as well as data about other agents, including as range, relative speed (Doppler), elevation, angular location, etc. The autonomous vehicle 10 further includes a sending module 206 that packages the acquired data and sends the packaged data to the communication interface 208 of the cognitive processor 32, as discussed below. The autonomous vehicle 10 further includes a receiving module 202 that receives operating commands from the cognitive processor 32 and performs the commands at the autonomous vehicle 10 to navigate the autonomous vehicle 10. The cognitive processor 32 receives the data from the autonomous vehicle 10, computes a trajectory for the autonomous vehicle 10 based on the provided state information and the methods disclosed herein and provides the trajectory to the autonomous vehicle 10 at the receiving module 202. The autonomous vehicle 10 then implements the trajectory provided by the cognitive processor 32.

The cognitive processor 32 includes various modules for communication with the autonomous vehicle 10, including an interface module 208 for receiving data from the autonomous vehicle 10 and a trajectory sender 222 for sending instructions, such as a trajectory to the autonomous vehicle 10. The cognitive processor 32 further includes a working memory 210 that stores various data received from the autonomous vehicle 10 as well as various intermediate calculations of the cognitive processor 32. A hypothesizer module(s) 212 of the cognitive processor 32 is used to propose various hypothetical trajectories and motions of one or more agents in the environment of the autonomous vehicle 10 using a plurality of possible prediction methods and state data stored in working memory 210. A hypothesis resolver 214 of the cognitive processor 32 receives the plurality of hypothetical trajectories for each agent in the environment and determines a most likely trajectory for each agent from the plurality of hypothetical trajectories.

The cognitive processor 32 further includes one or more decider modules 216 and a decision resolver 218. The decider module(s) 216 receives the most likely trajectory for each agent in the environment from the hypothesis resolver 214 and calculates a plurality of candidate trajectories and behaviors for the autonomous vehicle 10 based on the most likely agent trajectories. Each of the plurality of candidate trajectories and behaviors is provided to the decision resolver 218. The decision resolver 218 selects or determines an optimal or desired trajectory and behavior for the autonomous vehicle 10 from the candidate trajectories and behaviors.

The cognitive processor 32 further includes a trajectory planner 220 that determines an autonomous vehicle trajectory that is provided to the autonomous vehicle 10. The trajectory planner 220 receives the vehicle behavior and trajectory from the decision resolver 218, an optimal hypothesis for each agent 50 from the hypothesis resolver 214, and the most recent environmental information in the form of "state data" to adjust the trajectory plan. This additional step at the trajectory planner 220 ensures that any anomalous processing delays in the asynchronous computation of agent hypotheses is checked against the most recent sensed data from the data acquisition system 204. This additional step updates the optimal hypothesis accordingly in the final trajectory computation in the trajectory planner 220.

The determined vehicle trajectory is provided from the trajectory planner 220 to the trajectory sender 222 which provides a trajectory message to the autonomous vehicle 10 (e.g., at controller 34) for implementation at the autonomous vehicle 10.

The cognitive processor 32 further includes a modulator 230 that controls various limits and thresholds for the hypothesizer module(s) 212 and decider module(s) 216. The modulator 230 can also apply changes to parameters for the hypothesis resolver 214 to affect how it selects the optimal hypothesis object for a given agent 50, deciders, and the decision resolver. The modulator 230 is a discriminator that makes the architecture adaptive. The modulator 230 can change the calculations that are performed as well as the actual result of deterministic computations by changing parameters in the algorithms themselves.

An evaluator module 232 of the cognitive processor 32 computes and provides contextual information to the cognitive processor including error measures, hypothesis confidence measures, measures on the complexity of the environment and autonomous vehicle 10 state, performance evaluation of the autonomous vehicle 10 given environmental information including agent hypotheses and autonomous vehicle trajectory (either historical, or future). The modulator 230 receives information from the evaluator 232 to compute changes to processing parameters for hypothesizers 212, the hypothesis resolver 214, the deciders 216, and threshold decision resolution parameters to the decision resolver 218. A virtual controller 224 implements the trajectory message and determines a feedforward trajectory of various agents 50 in response to the trajectory.

Modulation occurs as a response to uncertainty as measured by the evaluator module 232. In one embodiment, the modulator 230 receives confidence levels associated with hypothesis objects. These confidence levels can be collected from hypothesis objects at a single point in time or over a selected time window. The time window may be variable. The evaluator module 232 determines the entropy of the distribution of these confidence levels. In addition, historical error measures on hypothesis objects can also be collected and evaluated in the evaluator module 232.

These types of evaluations serve as an internal context and measure of uncertainty for the cognitive processor 32. These contextual signals from the evaluator module 232 are utilized for the hypothesis resolver 214, decision resolver, 218, and modulator 230 which can change parameters for hypothesizer modules 212 based on the results of the calculations.

The various modules of the cognitive processor 32 operate independently of each other and are updated at individual update rates (indicated by, for example, LCM-Hz, h-Hz, d-Hz, e-Hz, m-Hz, t-Hz in FIG. 2).

In operation, the interface module 208 of the cognitive processor 32 receives the packaged data from the sending module 206 of the autonomous vehicle 10 at a data receiver 208a and parses the received data at a data parser 208b. The data parser 208b places the data into a data format, referred to herein as a property bag, that can be stored in working memory 210 and used by the various hypothesizer modules 212, decider modules 216, etc. of the cognitive processor 32. The particular class structure of these data formats should not be considered a limitation of the invention.

Working memory 210 extracts the information from the collection of property bags during a configurable time window to construct snapshots of the autonomous vehicle and various agents. These snapshots are published with a fixed frequency and pushed to subscribing modules. The data structure created by working memory 210 from the property bags is a "State" data structure which contains information organized according to timestamp. A sequence of generated snapshots therefore encompass dynamic state information for another vehicle or agent. Property bags within a selected State data structure contain information about objects, such as other agents, the autonomous vehicle, route information, etc. The property bag for an object contains detailed information about the object, such as the object's location, speed, heading angle, etc. This state data structure flows throughout the rest of the cognitive processor 32 for computations. State data can refer to autonomous vehicle states as well as agent states, etc.

The hypothesizer module(s) 212 pulls State data from the working memory 210 in order to compute possible outcomes of the agents in the local environment over a selected time frame or time step. Alternatively, the working memory 210 can push State data to the hypothesizer module(s) 212. The hypothesizer module(s) 212 can include a plurality of hypothesizer modules, with each of the plurality of hypothesizer modules employing a different method or technique for determining the possible outcome of the agent(s). One hypothesizer module may determine a possible outcome using a kinematic model that applies basic physics and mechanics to data in the working memory 210 in order to predict a subsequent state of each agent 50. Other hypothesizer modules may predict a subsequent state of each agent 50 by, for example, employing a kinematic regression tree to the data, applying a Gaussian Mixture Model/Markovian mixture model (GMM-HMM) to the data, applying a recursive neural network (RNN) to the data, other machine learning processes, performing logic based reasoning on the data, etc. The hypothesizer modules 212 are modular components of the cognitive processor 32 and can be added or removed from the cognitive processor 32 as desired.

Each hypothesizer module 212 includes a hypothesis class for predicting agent behavior. The hypothesis class includes specifications for hypothesis objects and a set of algorithms. Once called, a hypothesis object is created for an agent from the hypothesis class. The hypothesis object adheres to the specifications of the hypothesis class and uses the algorithms of the hypothesis class. A plurality of hypothesis objects can be run in parallel with each other. Each hypothesizer module 212 creates its own prediction for each agent 50 based on the working current data and sends the prediction back to the working memory 210 for storage and for future use. As new data is provided to the working memory 210, each hypothesizer module 212 updates its hypothesis and pushes the updated hypothesis back into the working memory 210. Each hypothesizer module 212 can choose to update its hypothesis at its own update rate (e.g., rate h-Hz). Each hypothesizer module 212 can individually act as a subscription service from which its updated hypothesis is pushed to relevant modules.

Each hypothesis object produced by a hypothesizer module 212 is a prediction in the form of a state data structure for a vector of time, for defined entities such as a location, speed, heading, etc. In one embodiment, the hypothesizer module(s) 212 can contain a collision detection module which can alter the feedforward flow of information related to predictions. Specifically, if a hypothesizer module 212 predicts a collision of two agents 50, another hypothesizer module may be invoked to produce adjustments to the hypothesis object in order to take into account the expected collision or to send a warning flag to other modules to attempt to mitigate the dangerous scenario or alter behavior to avoid the dangerous scenario.

For each agent 50, the hypothesis resolver 118 receives the relevant hypothesis objects and selects a single hypothesis object from the hypothesis objects. In one embodiment, the hypothesis resolver 118 invokes a simple selection process. Alternatively, the hypothesis resolver 118 can invoke a fusion process on the various hypothesis objects in order to generate a hybrid hypothesis object.

Since the architecture of the cognitive processor is asynchronous, if a computational method implemented as a hypothesis object takes longer to complete, then the hypothesis resolver 118 and downstream decider modules 216 receive the hypothesis object from that specific hypothesizer module at an earliest available time through a subscription-push process. Time stamps associated with a hypothesis object informs the downstream modules of the relevant time frame for the hypothesis object, allowing for synchronization with hypothesis objects and/or state data from other modules. The time span for which the prediction of the hypothesis object applies is thus aligned temporally across modules.

For example, when a decider module 216 receives a hypothesis object, the decider module 216 compares the time stamp of the hypothesis object with a time stamp for most recent data (i.e., speed, location, heading, etc.) of the autonomous vehicle 10. If the time stamp of the hypothesis object is considered too old (e.g., pre-dates the autonomous vehicle data by a selected time criterion) the hypothesis object can be disregarded until an updated hypothesis object is received. Updates based on most recent information are also performed by the trajectory planner 220.

The decider module(s) 216 includes modules that produces various candidate decisions in the form of trajectories and behaviors for the autonomous vehicle 10. The decider module(s) 216 receives a hypothesis for each agent 50 from the hypothesis resolver 214 and uses these hypotheses and a nominal goal trajectory for the autonomous vehicle 10 as constraints. The decider module(s) 216 can include a plurality of decider modules, with each of the plurality of decider modules using a different method or technique for determining a possible trajectory or behavior for the autonomous vehicle 10. Each decider module can operate asynchronously and receives various input states from working memory 212, such as the hypothesis produced by the hypothesis resolver 214. The decider module(s) 216 are modular components and can be added or removed from the cognitive processor 32 as desired. Each decider module 216 can update its decisions at its own update rate (e.g., rate d-Hz).

Similar to a hypothesizer module 212, a decider module 216 includes a decider class for predicting an autonomous vehicle trajectory and/or behavior. The decider class includes specifications for decider objects and a set of algorithms. Once called, a decider object is created for an agent 50 from the decider class. The decider object adheres to the specifications of the decider class and uses the algorithm of the decider class. A plurality of decider objects can be run in parallel with each other.

The decision resolver 218 receives the various decisions generated by the one or more decider modules and produces a single trajectory and behavior object for the autonomous vehicle 10. The decision resolver can also receive various contextual information from evaluator modules 232, wherein the contextual information is used in order to produce the trajectory and behavior object.

The trajectory planner 220 receives the trajectory and behavior objects from the decision resolver 218 along with the state of the autonomous vehicle 10. The trajectory planner 220 then generates a trajectory message that is provided to the trajectory sender 222. The trajectory sender 222 provides the trajectory message to the autonomous vehicle 10 for implementation at the autonomous vehicle 10, using a format suitable for communication with the autonomous vehicle 10.

The trajectory sender 222 also sends the trajectory message to virtual controller 224. The virtual controller 224 provides data in a feed-forward loop for the cognitive processor 32. The trajectory sent to the hypothesizer module (s) 212 in subsequent calculations are refined by the virtual controller 224 to simulate a set of future states of the autonomous vehicle 10 that result from attempting to follow the trajectory. These future states are used by the hypothesizer module(s) 212 to perform feed-forward predictions.

Various aspects of the cognitive processor 32 provide feedback loops. A first feedback loop is provided by the virtual controller 224. The virtual controller 224 simulates an operation of the autonomous vehicle 10 based on the provided trajectory and determines or predicts future states taken by each agent 50 in response to the trajectory taken by the autonomous vehicle 10. These future states of the agents can be provided to the hypothesizer modules as part of the first feedback loop.

A second feedback loop occurs because various modules will use historical information in their computations in order to learn and update parameters. Hypothesizer module(s) 212, for example, can implement their own buffers in order to store historical state data, whether the state data is from an observation or from a prediction (e.g., from the virtual controller 224). For example, in a hypothesizer module 212 that employs a kinematic regression tree, historical observation data for each agent is stored for several seconds and used in the computation for state predictions.

The hypothesis resolver 214 also has feedback in its design as it also utilizes historical information for computations. In this case, historical information about observations is used to compute prediction errors in time and to adapt hypothesis resolution parameters using the prediction errors. A sliding window can be used to select the historical information that is used for computing prediction errors and for learning hypothesis resolution parameters. For short term learning, the sliding window governs the update rate of the parameters of the hypothesis resolver 214. Over larger time scales, the prediction errors can be aggregated during a selected episode (such as a left turn episode) and used to update parameters after the episode.

The decision resolver 218 also uses historical information for feedback computations. Historical information about the performance of the autonomous vehicle trajectories is used to compute optimal decisions and to adapt decision resolution parameters accordingly. This learning can occur at the decision resolver 218 at multiple time scales. In a shortest time scale, information about performance is continuously computed using evaluator modules 232 and fed back to the decision resolver 218. For instance, an algorithm can be used to provide information on the performance of a trajectory provided by a decider module based on multiple metrics as well as other contextual information. This contextual information can be used as a reward signal in reinforcement learning processes for operating the decision resolver 218 over various time scales. Feedback can be asynchronous to the decision resolver 218, and the decision resolver 218 can adapt upon receiving the feedback.

Figure 3:
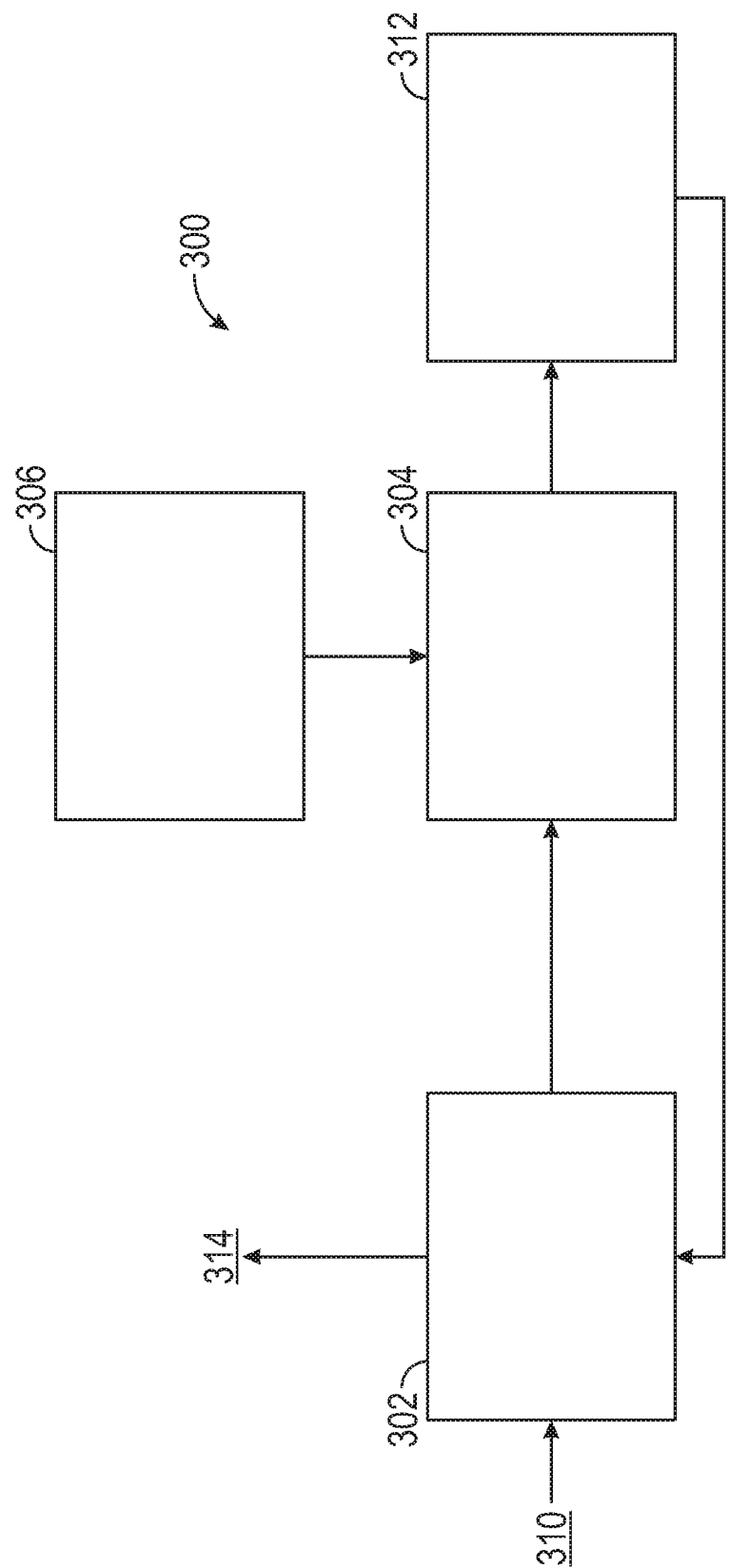
FIG. 3 shows a schematic diagram of an episodic memory subsystem that is suitable for use with the cognitive processor.

FIG. 3 shows a schematic diagram of an episodic memory subsystem 300 that is suitable for use with the cognitive processor 32. The episodic memory subsystem 300 can be used as a hypothesizer 212 of the cognitive processor 32, but can be used in other modules of the cognitive processor 32 in alternate embodiments. The episodic memory subsystem 300 includes an episodic memory 302, a hyper-association controller 304 and a modulator 306.

The subsystem 300 is used to receive a current episode (referred to herein as a "partial prefix") and output an episode stored in the episodic memory 302 as a hypothesis episode that can be used in the cognitive processor 32 for navigation purposes. The episodic memory 302 stores a plurality of episodes obtained during operation of the vehicle 10. An episode is an observed spatiotemporal data sequence of objects within a scene. A partial prefix 310 is received at the episodic memory in order to recall episodes stored in the episodic memory 302. The partial prefix 310 is a spatio-temporal data sequence that has been currently retrieved at the vehicle while driving. The partial prefix 310 is used to initiate the recall process at the episodic memory 302 to retrieve episode candidates. Episodes stored in the episodic memory 302 are compared to the partial prefix 310, and those episodes that match the partial prefix to a selected amount are retrieved as episode candidates.

The episode candidates are provided to the hyper-association controller 304. The hyper-association controller 304 compares each candidate to the partial prefix in order to determine an intermediate episode that can be used to produce a final superset episode 314 that can be provided as a hypothesis episode to the cognitive processor 32. Due to the complexity of a spatio-temporal data streams, it is unlikely that the partial prefix 310 exactly matches any particular episode candidate. Therefore, matching the partial prefix 310 to the episode candidate includes defining a metric or similarity measure and a criterion for selection based on the metric or similarity measure. In various embodiments, the metric can be an L2 norm. The modulator 306 can be used to supply a selection criterion. Each candidate episode is ranked according to a degree to which the candidate matches the partial prefix 310 (i.e., a size of the metric). A candidate having a smallest metric (or highest similarity) can be selected as an intermediate superset episode 312.

When none of the recalled episode candidates satisfy the criterion, the hyper-association module 304 can combine the episode candidates one by one in order to create the intermediate superset episode 312. The candidates can be combined in order from the most similar to the least similar. The intermediate superset episode 312 can then be provided back to the episodic memory. At the episodic memory, the intermediates episode 312 is used to trigger another recall of episodes. The intermediate episode 312 recalls an episode that can be used at the cognitive processor 32 as a hypothesis episode.

If the intermediate superset episode 312 recalls more than one episode, these episodes can be provided to the hyperassociation module 304 as episode candidates. The episodic memory 302 and hyper-association module 304 therefore form a feedback loop that can be looped through until a single episode is recalled from episodic memory 302 to serve as the hypothesis episode.

In various embodiments, the partial prefix can be stored in episodic memory once the hypothesis episode is produced in order to serve as a stored episode.

The methods disclosed herein of producing a hypothesis episode have the advantage of working with various training sets. Usually, a training set of episodes is not a complete set that contains all possible episodes for a reasonable application. A complete training set of episodes can be provided, at the cost of high storage requirements. In addition, even a complete training set can become incomplete as the driving environment changes. The methods disclosed herein are capable of working effectively with an incomplete training set of episodes.

The episodic memory 302 includes a collective hash-based event database that reduces an amount of required storage to store the episodes by sharing the same events between the episodes. The events of the stored episodes are separated from their episodes and put into a common event database when they do not exist in the database.

When the same events are found in the database, these events are shared. Multiple episodes share the same events in the database instead of keeping their own instances in themselves. Also, when an event occurs several times in an episode, the episode shares the same event in the database instead of keeping the same multiple instances in itself.

A hash function can be used to facilitate accessing events in the hash-based event database. A suitable hash function can map hash keys to the corresponding events or a few candidate events to reduce the required number of comparisons until finding the matching events.

A common event-sequence graph structure of the stored episodes reduces the retrieving time for the matching episodes with a partial prefix. When multiple episodes have many common events in their sequences, they share the same main path in the graph, branch to alternative paths whenever they encounter different event segments, and merge back to the main path when they have a common event. These shared nodes represent events in multiple episodes. Comparing the events in the partial prefix with the sharing nodes has the same effect of comparing the partial prefix with the multiple episodes sharing the nodes.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating an autonomous vehicle, comprising
    obtaining a partial prefix at the autonomous vehicle, wherein the partial prefix is an observed spatiotemporal data sequence of an object within a scene;
    recalling a plurality of candidate episodes from an episodic memory associated with the autonomous vehicle in response to receiving the partial prefix at the episodic memory, wherein the plurality of candidate episodes are spatiotemporal data sequences;
    comparing at a hyper-association module associated with the autonomous vehicle, the plurality of candidate episodes to the partial prefix to obtain a similarity metric for each of the plurality of candidate episodes;
    combining candidate episodes having a highest similarity to the partial prefix to obtain an intermediate superset episode, when none of the similarity metrics meets a criterion;
    recalling a hypothesis episode from the episodic memory using the intermediate superset episode; and
    navigating the autonomous vehicle based on the hypothesis episode.

2. The method of claim 1, wherein the intermediate episode recalls more than one candidate episode from the episode memory, further comprising providing the candidate episode recalled by the intermediate episode to the hyper-association module.

3. The method of claim 1, wherein the episodic memory and hyper-association module are components of a hypothesizer of a cognitive processor of the autonomous vehicle, and the hypothesizer provides the hypothesis episode to the cognitive processor.

4. The method of claim 1, wherein the hyper-association module selects candidate episode from the plurality of candidate episodes having the smallest metric as the intermediate episode.

5. The method of claim 1, further comprising creating the intermediate episode by combining the candidates in the order of a rank based on the metric.

6. A system for operating an autonomous vehicle, comprising
    an episodic memory for storing a plurality of episodes and to recall a plurality of candidate episodes in response to receiving a partial prefix, wherein the partial prefix is an observed spatiotemporal data sequence of an object within a scene and the plurality of candidate episodes are spatiotemporal data sequences;
    a hyper-association module configured to receive the plurality of candidate episodes from the episodic memory, compare the plurality of candidate episodes to the partial prefix to obtain a similarity metric for each of the plurality of candidate episodes, and combine candidate episodes having a highest similarity to the partial prefix to obtain an intermediate superset episode, when none of the similarity metrics meets a criterion, wherein the episodic memory recalls a hypothesis episode using the intermediate superset episode; and
    a navigation system configured to navigate the autonomous vehicle using the hypothesis episode.

7. The system of claim 6, wherein the episodic memory and hyper-association module are components of a hypothesizer of a cognitive processor of the autonomous vehicle.

8. The system of claim 6, wherein the hyper-association module selects a candidate episode from the plurality of candidate episodes having the smallest metric as the intermediate episode.

9. The system of claim 6, wherein the hyper-association module creates the intermediate episode by combining the candidates in the order of a rank based on the metric.

10. An autonomous vehicle, comprising
    an episodic memory for storing a plurality of episodes and to recall a plurality of candidate episodes in response to receiving a partial prefix, wherein the partial prefix is an observed spatiotemporal data sequence of an object within a scene and the plurality of candidate episodes are spatiotemporal data sequences;

a hyper-association module configured to receive the plurality of candidate episodes from the episodic memory, compare the plurality of candidate episodes to the partial prefix to obtain a similarity metric for each of the plurality of candidate episodes, and combine candidate episodes having a highest similarity to the partial prefix to obtain an intermediate superset episode, when none of the similarity metrics meets a criterion, wherein the episodic memory recalls a hypothesis episode using the intermediate superset episode; and a navigation system configured to navigate the autonomous vehicle using the hypothesis episode.

11. The vehicle of claim 10, wherein the episodic memory and hyper-association module are components of a hypothesizer of a cognitive processor of the autonomous vehicle.

12. The vehicle of claim 10, wherein the hyper-association module selects a candidate episode from the plurality of candidate episodes having the smallest metric as the intermediate episode.

13. The vehicle of claim 10, wherein the hyper-association module creates the intermediate episode by combining the candidates in the order of a rank based on the metric.

* * * * *